US010339123B2

(12) United States Patent
Venkatesh et al.

(10) Patent No.: US 10,339,123 B2
(45) Date of Patent: Jul. 2, 2019

(54) DATA MANAGEMENT FOR TENANTS

(71) Applicant: HEWLETT PACKARD ENTERPRISE DEVELOPMENT LP, Houston, TX (US)

(72) Inventors: Dinesh Venkatesh, Andover, MA (US); Kishore Kumar M, Bangalore (IN)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 206 days.

(21) Appl. No.: 15/507,227

(22) PCT Filed: Jan. 15, 2015

(86) PCT No.: PCT/US2015/011540
§ 371 (c)(1),
(2) Date: Feb. 27, 2017

(87) PCT Pub. No.: WO2016/069034
PCT Pub. Date: May 6, 2016

(65) Prior Publication Data
US 2017/0286465 A1   Oct. 5, 2017

(30) Foreign Application Priority Data
Nov. 1, 2014   (IN) .......................... 5485/CHE/2014

(51) Int. Cl.
*G06F 16/00*   (2019.01)
*G06F 16/22*   (2019.01)
(Continued)

(52) U.S. Cl.
CPC .......... *G06F 16/2246* (2019.01); *G06F 16/00* (2019.01); *G06F 16/13* (2019.01); *G06F 16/21* (2019.01); *G06F 16/22* (2019.01)

(58) Field of Classification Search
CPC ............... G06F 17/30; G06F 17/30091; G06F 17/30289; G06F 17/30312;
(Continued)

(56) References Cited

U.S. PATENT DOCUMENTS 8,180,813 B1   5/2012   Goodson et al.
8,285,681 B2   10/2012   Prahlad et al.
(Continued)

OTHER PUBLICATIONS

Hewlett-Packard Development Company, L.P., "HP MSA 2040 Storage Configuration and Best Practices for VMware vSphere," (Technical Specifications), copyright 2013, 39 pages, available at http://h20195.www2.hp.com/V2/GetPDF.aspx%2F4AA4-7060ENW.pdf.
(Continued)

*Primary Examiner* — Vincent F Boccio
(74) *Attorney, Agent, or Firm* — Hewlett Packard Enterprise Patent Department

(57) ABSTRACT

Examples of data management for tenants are described herein. In an example, a storage system includes a management tree for each of a plurality of tenants associated with the storage system. The management tree includes data management policies defined by the tenant. Further, the management tree includes a storage tree, which is mapped to a storage domain. The storage domain may hold data pertaining to the tenant. The data may be managed based on the data management policies defined by one of the management tree and the storage tree.

20 Claims, 6 Drawing Sheets

(51) Int. Cl.
*G06F 16/13* (2019.01)
*G06F 16/21* (2019.01)

(58) Field of Classification Search
CPC ........... G06F 17/30327; G06F 16/2246; G06F 16/00; G06F 16/13; G06F 16/21; G06F 16/22
USPC ......................................................... 707/812
See application file for complete search history.

(56) References Cited

U.S. PATENT DOCUMENTS

| | | | |
|---|---|---|---|
| 8,407,190 B2 | 3/2013 | Prahlad et al. | |
| 8,719,768 B2 | 5/2014 | Hass et al. | |
| 9,361,321 B1* | 6/2016 | Auchmoody | G06F 17/30289 |
| 2003/0120948 A1* | 6/2003 | Schmidt | H04L 63/0815 726/8 |
| 2004/0039594 A1* | 2/2004 | Narasimhan | G06F 21/10 705/1.1 |
| 2004/0186845 A1* | 9/2004 | Fukui | G06F 17/30327 |
| 2007/0179991 A1 | 8/2007 | Burnett et al. | |
| 2008/0275879 A1* | 11/2008 | Hammen | G06F 17/30958 |
| 2009/0007162 A1 | 1/2009 | Sheehan | |
| 2009/0157433 A1* | 6/2009 | Schmidt | G06Q 40/08 705/4 |
| 2011/0137966 A1 | 6/2011 | Srinivasan et al. | |
| 2012/0221789 A1 | 8/2012 | Felter et al. | |
| 2013/0262801 A1 | 10/2013 | Sancheti et al. | |
| 2014/0006465 A1 | 1/2014 | Davis et al. | |
| 2014/0075565 A1* | 3/2014 | Srinivasan | G06Q 10/06315 726/26 |
| 2014/0082279 A1 | 3/2014 | Kimmel et al. | |

OTHER PUBLICATIONS

International Search Report & Written Opinion received in PCT Application No. PCT/US2015/011540, dated Jun. 24, 2015, 10 pages.
Wikipedia, "IBRIX Fusion," available online at <https://en.wikipedia.org/w/index.php?title=IBRIX_Fusion&oldid=736962769>, Aug. 30, 2016, 1 page.
Dell EMC, "EMC Isilon OneFS Operating System", Dell Inc. or its subsidiaries, White Paper, 2017, 12 pages.
NetApp, "Data ONTAP 8—Data Storage Operating System", Clustered Data ONTAP® 8.2 : Logical Storage Management Guide, Feb. 2014, 205 pages.
Moulton et al., "Introduction to NetApp Infinite Volume," NetApp, Technical Report, TR-4037, 2013, pp. 1-10.
LMS and JRB, "The New Hitchhiker's Guide to Tru64 AdvFS", Version 2.2, Mar. 9, 2006, 229 pages.
International Preliminary Report on Patentability received for PCT Patent Application No. PCT/US2015/011540, dated May 11, 2017, 7 pages.
HP, "Scale-Out Enterprise File and Object Storage—HP StoreAll Storage", Data sheet, 2009, 4 pages.
Gupta et al., "Best Practices for NetApp Infinite Volume in Data ONTAP 8.1.x Operating in Cluster Mode", NetApp, Technical Report, TR-4078, Sep. 2012, pp. 1-20.
EMC2, "Introduction to EMC Isilon Scale-out NAS from a Traditional NAS perspective," EMC Corporation, Mar. 2014, pp. 1-19.
Edwards et. al., "FlexVols: Flexible, Efficient File Volume Virtualization in WAFL," in USENIX '08, 2008 USENIX Annual Conference, NetApp, Inc., pp. 1-23.

* cited by examiner

DATA MANAGEMENT FOR TENANTS

BACKGROUND

With the expansion of information technology (IT) and related industries, more and more data is getting stored, tiered, and archived. This has further led to development of different storage solutions, such as storage area network (SAN). Storage capacities of such system are to be efficiently managed. For managing the storage capacities of such storage infrastructures, a global namespace may be used.

BRIEF DESCRIPTION OF DRAWINGS

The detailed description is described with reference to the accompanying figures. In the figures, the left-most digit(s) of a reference number identifies the figure in which the reference number first appears. The same numbers are used throughout the figures to reference like features and components.

DETAILED DESCRIPTION

Figure 1:
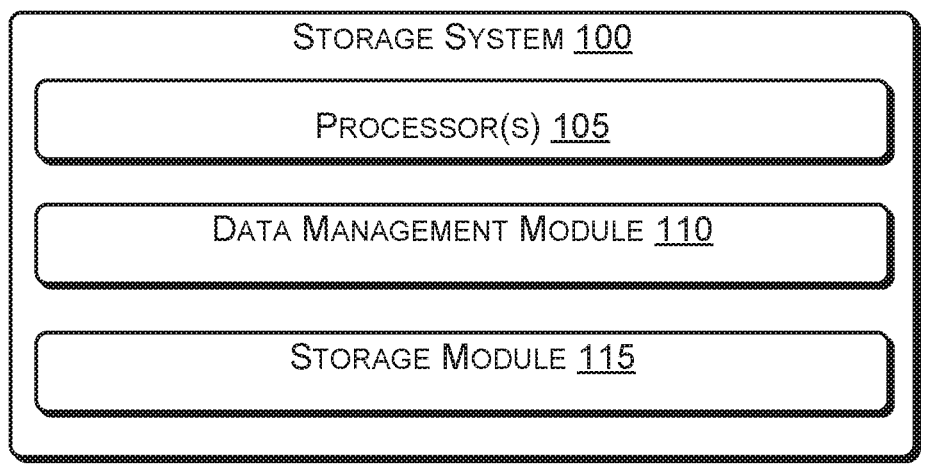
FIG. 1 illustrates a storage system in accordance to an example of the present subject matter.

Generally, organizations may store data in a central location, which may be provided by way of a storage system. Such storage systems may be implemented through a storage infrastructure employing a plurality of storage devices. An example of such a storage infrastructure includes a storage area network (SAN). As would be understood, the storage systems provide for centralized storage, extraction, and management of data. To better manage the data stored in the storage system, global namespace based storage systems may be presently utilized.

A global namespace may be understood as a logical layer, which may provide viewing and accessing of files independent of their actual physical file locations. The global namespace provides administrators the ability to add, modify, move, and reconfigure physical file storage without affecting how users view and access data stored in the physical file storage.

Generally global namespace based storage systems provide for capacity management, but they do not provide for thin provisioning while supporting multiple-tenants. Furthermore, such storage systems may utilize hard partitioning of the storage capacity allocated to each of the tenants, which may lead to inefficient utilization of the storage capacity. Further, the storage systems may not provide sufficient fault resilience, thereby resulting in the likelihood of data unavailability in case of hardware or software failure. For example, consider there are two tenants, say, tenant A and tenant B, who are allocated definitive storage blocks by a storage system. Therefore, tenant A may be associated with a unique storage block, and similarly, tenant B may be associated with a different storage block. As would also be understood, any of the storage block becoming unavailable, either temporarily or permanently, is likely to impact the data availability for the respective tenants. Furthermore, to address any issues relating to provisioning, additional storage capacity may be deployed in anticipation of a growing demand for storage capacity by any of the tenants.

Aspects of the present subject matter relate to systems and methods to manage storage capacity for a plurality of tenants, based on a storage architecture implementing management trees and storage trees. Multiple tenants may use storage capacity provided in a storage system, such as a SAN based storage system, by using a global namespace architecture. In one example, an abstraction in form of a management tree may be specified for each tenant within a global namespace. A management tree may be understood as a namespace entity, in the global namespace, having data management policies for a corresponding tenant. Accordingly, each management tree may be further associated with a plurality of data management policies which may determine the manner in which data pertaining to a corresponding tenant is to be accessed or modified. The data management policies may include, for instance, data retention policies, authentication policies, data access policies, policies defining user quotas, and policies defining anti-virus mechanisms to be used for the data associated with the management trees.

The management tree may be unique for a specific tenant. The tenant may be any functional or business organization, which in turn may further include one or more units each corresponding to a business function of the organization. A unit may be defined in terms of functionality of various departments, such as marketing, finance, research and development (R&D), and human resources (HR), of the tenant. In other examples, the unit may be defined, based on different parameters, such as user role, geographic location of a user, and device type of the user.

A management tree may be specified as a hierarchical structure having a root and various child nodes. Each of the child nodes may further be associated with child management trees. A child management tree may correspond to a unit of the tenant. Similar to a parent management tree, the child management tree may be associated with their respective data management policies that may be specific for a unit of the tenant. For instance, the tenant may have different data management policies for an HR unit and a separate set of data management policies for the R&D unit. Accordingly, the data management may be provided not only at a tenant level but also at a unit level To store data pertaining to the tenant, the child management tree or the management tree may be mapped to a storage tree. The storage tree may be understood to be a namespace entity based on which user created files and directories are stored. The storage tree may map to one or more storage domains where data pertaining to a tenant or a unit of the tenant is to be stored. In one example, a storage domain may be a smallest unit of storage block, the storage block being a container for holding data. The storage domain may be associated with multiple storage attributes, which may aid in selection of an appropriate storage domain for a tenant. The storage attributes may be fault containment attribute of a storage block, price associated with the storage block, performance of the storage block, and geographic location of the storage block. Thus, the storage tree provides for mapping of the storage domains to the global namespace that encompasses multiple storage domains.

The present subject provides for fault resiliency to avoid or minimize data unavailability. In the present storage system, as the data can be effectively spread and managed, an administrator may be provided the flexibility to allocate the storage domains and map the same to management trees and storage trees. Consequently, impact of faults on the overall storage system may now be contained in a sub-set of the storage system defined by a storage tree. In other words, if a fault in a storage domain occurs, it may impact the storage trees mapping to it and may have limited or no impact on other storage trees.

These and other aspects are further described in conjunction with the following figures. It should be noted that the description and figures merely illustrate the principles of the present subject matter. Further, various arrangements may be devised that, although not explicitly described or shown herein, embody the principles of the present subject matter and are included within its scope.

Examples of how devices and methods for data management for tenants may be implemented are explained in detail with respect to the figures. While aspects of described devices and methods for data management for tenants can be implemented in any number of different devices, environments, and/or implementations, the examples, and implementations are described in the context of the following figure(s).

FIG. 1 illustrates a storage system 100, according to an example of the present subject matter. The storage system 100 is capable providing storage capacity to multiple tenants. In an example, the storage system 100, among other things, include a processor(s) 105, a data management module 110, and a storage module 115.

The processor(s) 105 may include microprocessors, microcomputers, microcontrollers, digital signal processors, central processing units, state machines, logic circuitries, virtual machines, and/or any other devices that manipulate signals and data based on computer-readable instructions. Further, functions of the various elements shown in the figures, including any functional blocks labeled as "processor(s)", may be provided through the use of dedicated hardware as well as hardware capable of executing computer-readable instructions.

In an example, each of the plurality of tenants may have a corresponding management trees (not shown FIG. 1), each being further associated with one or more data management policies. The data management policies may define rules for managing data stored in storage domains corresponding to the tenant and data storage requests directed to data pertaining to the tenant. The management tree may in turn contain a storage tree or a set of storage trees (not shown FIG. 1), which may provide for capacity management in the storage system 100. For providing capacity management, each of the storage trees may be further associated with one or more storage domains.

To manage the data of a tenant in accordance with the data management policies specific to the tenant, the data management module 110 may identify a management tree corresponding to a tenant to determine the data management policies corresponding to the tenant. Further, the storage module 115 may determine the storage tree corresponding to the management tree to identify the storage domains holding data pertaining to the tenant. The data in the storage domains may be managed based on the data management policies defined by the identified management tree or the storage tree. It will be appreciated that management may include data access, data retention, data erasure, data protection, and the like.

Figure 2:
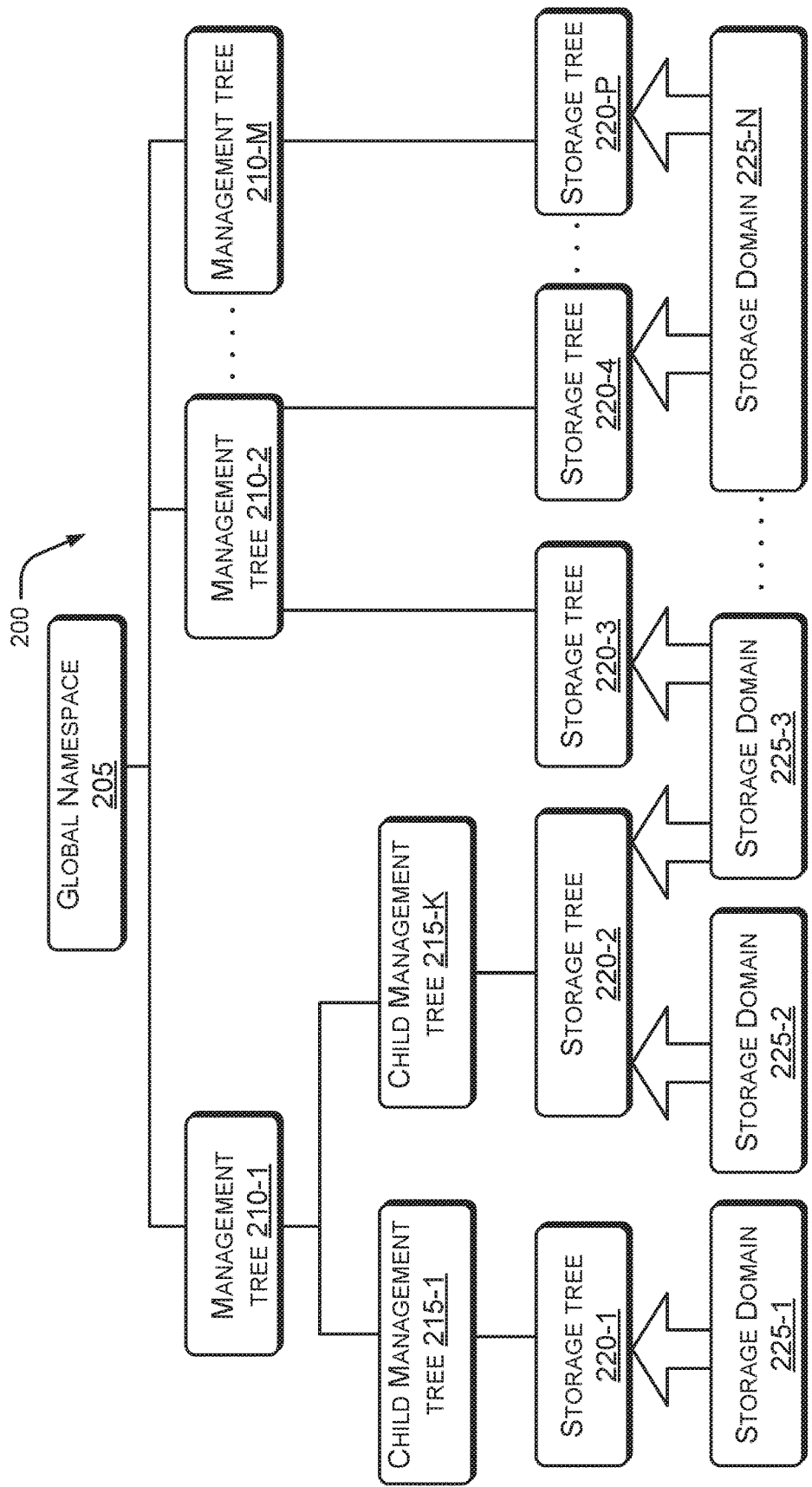
FIG. 2 illustrates a storage network architecture, in accordance to an example of the present subject matter.

FIG. 2 illustrates storage network architecture 200, according to an example of the present subject matter. For the sake of brevity, certain components, such as switches, pair of servers and storage in highly available (HA) configurations, just a bunch of disks (JBOD) enclosures, directories, files, segments, and files systems have not been illustrated in the present figure. In an example, the storage network architecture 200 is a global namespace based scale out storage network. Further, the storage system 100 may be realized as a virtual system. The present subject matter provides for supporting multiple tenants under a single namespace, represented as global namespace 205.

To support multiple tenants, the namespace may be logically partitioned into multiple management domains known as management trees, such as management tree 210-1, management tree 210-2, and management tree 210-M. The management trees 210-1, 210-2, . . . and 210-M (collectively referred to as management trees 210) may each further be associated with one or more data management policies pertaining to a corresponding tenant. The data management policies may describe rules for providing access and managing data pertaining to the tenant. For instance, the data management policies may describe authentication policies, data erasure policies, data retention policies, anti-virus policies, and user storage space allocation policies.

It will be appreciated that each tenant may be associated with different separate data management policies. However, in case no such policy is defined by the tenant, default data management policies may be implemented for the tenant. Accordingly, the management tree 210 corresponding to such a tenant may include the default data management policies. In an example, the default data management policies may be predefined by an administrator.

A tenant may choose to impose same data management policies on all units or may have separate data access polices for some or all of the units. In case separate data management policies are to be imposed, unit-wise data security and control may be provided by way of child management trees 215-1 . . . 215-K branching from a management tree 210. The child management trees 215-1 . . . 215-K may be collectively referred to as child management trees 215 and may be individually referred to as child management tree 215. A child management tree 215 may accordingly include the data management policies for managing data pertaining to a unit of the tenant.

In an example, the unit of a tenant may be categorized based on various parameters, such as functionality, user role, and geographic location. For instance, functionality based categorization may provide units, such as finance, human resources, research and development, sales, marketing, and information technology support. Likewise, user role based categorization may provide units, such as trainee, associate, senior associate, scientists, managers, and so on.

Referring to FIG. 2, the management tree 210-1 is illustrated to have the child management trees 215-1 and 215-K. As illustrated, the child management trees 215 and the management trees 210, such as the management tree 210-M having no child management tree nodes, may in turn may map to one or more storage trees, such as storage tree 220-1, storage tree 220-2, storage tree 220-3, . . . and storage tree 220-P (collectively referred to as storage trees 220). While the management trees 210 and the child management trees 215 provide for policy management, storage capacity management may be provided by way of the storage trees 220, as explained in the following sections.

A storage tree 220 may be understood to be a namespace entity below which all user created files and directories may reside. The storage tree 220 may also function to provide control points in the namespace where various functionalities such snapshot, disaster recover (DR) replication, and fault management policies may be implemented. Additionally, the storage tree 220 may provide for capacity management by specifying limits on the size of the storage tree 220. Further, additional data management policies can be set at the storage tree 220. Examples such policies include, allocation policy of how objects in the storage tree 220 may spread across multiple storage domains 225 a storage tree 220 can span, quota limits, snap-schedule, DR snap policies, Archive Journal, and Metabox/Express query ON/OFF.

In an example, for any object in the storage tree 220, the data management policies may be inherited from the storage tree 220, and if the data management policy is not set at the storage tree 220, the data management policy from the management tree 210 or 215 corresponding to the storage tree may be enforced. If the same policy is set on both storage tree 220 and its parent management tree, the data management policy of the storage tree 220 may override that of management tree 210 or 215. Thus, the data management policies may be checked from bottom of the hierarchy to the top, i.e., from the storage tree level to the root of the global namespace 205. However, certain exceptions may be defined in case of a policy conflict, for instance, in case quota allocation is defined by both the storage tree 220 and the parent management tree 210 or 215, the quota allocation policy defined by the management tree 210 may be enforced.

In another example, one or more storage domains 225-1, 2, . . . , N may be determined. Once the storage domains 225-1, 2, . . . , N (collectively referred to as storage domains 225) are determined, the same are mapped to the storage tree 220. A storage domain 225 may be understood to be a unit of capacity block allocated to the tenants in the storage network architecture 200. The storage domain 225 may be implemented, for instance, through a storage area network (SAN) couplet, a redundant array of independent disks (RAID) couplet, a disk array, and a JBOD enclosure.

The storage domains 225 may each be associated with one or more attribute-based storage blocks, the storage attributes being, for instance, performance of the storage block, fault containment, location of the storage block, and pricing of the storage block. Such storage attributes may be used for determining which of the storage domains 225 are to be selected for associating with a storage tree from amongst the storage trees 220. In such a case, the storage domains 225 that may provide storage capacity to a tenant may be selected based on the storage attributes selected or specified by the tenant. These storage attributes may be defined in the corresponding management tree 210 of the tenant. Based on the selected storage attributes, the storage domains 225 may be selected for the tenant. For example, a tenant may specify that fast processing storage capacity is to be used or the storage capacity available in a specific geographic location to be used. In this example, if the tenant wishes to avail flash type storage which are located within a geographic location in close proximity to the tenant's organization, then a storage domain having flash type storages within the one of the storage domains 225 in the chosen geographic location attribute may be selected.

As mentioned earlier, the storage tree 220 may map to one or more storage domains 225. As per the present illustration, the storage tree 220-1 maps to the storage domain 225-1 and the storage tree 220-2 maps to the storage domain 225-2 and 225-3. The mapping of any one of the storage trees 220 with one or more storage domains 225 may be based on the quota allocated to a tenant or a unit of the tenant and the selected storage attributes. Further, in other examples, the storage domain 225 may also be shared among multiple units or tenants, i.e., multiple storage trees 220 may map to the same storage domain 225. For instance, in cases where multiple tenants have selected the similar storage attributes, the same storage domain 225 may be mapped to their corresponding storage trees 220.

The mapping of multiple storage trees 220 to same storage domain is also illustrated in FIG. 2 and may be better understood with the following example. Referring to FIG. 2, the data pertaining to a tenant corresponding to the management tree 210-2 may be stored in the storage domain 225-3 and the storage domain 225-N, where corresponding storage trees 220-3 and 220-4 may provide for capacity management. Further, the data pertaining to another tenant corresponding to the management tree 210-M may also be stored in the storage domain 225-N, where the storage tree 220-P provides for capacity management. Thus, the storage domain 225-3 is shared between the storage tree 220-2 and the storage tree 220-3, and the storage domain 225-N is shared between the storage tree 220-4 and the storage tree 220-P. In the present example, the management trees 210-1, 210-2 and 210-M may provide for data security, as the data being stored in the storage domain 225-3 and storage domain 225-N, by executing corresponding data management policies. Similarly, the storage domains 225 may also be shared among various units of the tenants.

Further, thin provisioning may be realized in the present example, as storage domain 225 is now shared among various tenants, which may utilize storage capacity at varying rates. This way, the present architecture may support thin provisioning and at the same time may also provide data security.

In an example, notion of the management trees 210, the child management trees 215, and the storage trees 220 may be realized in multiple ways. For instance, the management trees 210, the child management trees 215, and the storage trees 220 may map to directories in the namespace. However, in other examples, the child management trees 215, and the storage trees 220 may be stored in a database, and a node, for instance, a node corresponding to a management tree 210 may be provided in the namespace and this node may function as an entry point of hierarchy defined by the management tree 210. Thus, the storage network architecture 200 may implement property inheritance model of the management, child management, and storage trees in different ways in different implementations.

The storage network architecture 200 may be expressed logically in terms of following equations:

$$\{\text{Global Storage Space}\}=U_1^N\{\text{Storage Domain}_i\} \{i=1,\ldots,N\} \quad (1)$$

$$\{\text{Global Namespace}\} \Rightarrow \{\text{Global Storage Space}\} \quad (2)$$

$$\{\text{Global Namespace}\}=U_1^M\{\text{Management Tree}_i\} \quad (3)$$

$$\{\text{Management Tree}\}=\{U_1^K\{\text{Child Management Tree}_j\}|U_1^P\{\text{Storage Tree}_l\}\} \quad (4)$$

$$\{\text{Storage Tree}_i\} \Rightarrow U_1^R\{\text{Storage Domain}_i\}\{R=1,\ldots N\} \quad (5)$$

Equation (1) represents that global storage space of the storage system 100. As can be gathered from equation (1), the global storage space comprises a plurality of storage domains 225, say 1 to N. Thus, the storage domains 225 make up storage space, i.e., available capacity of the storage system 100. Equation (2) represents that global namespace maps to global storage space and is realized in the global storage space. Subsequent equations illustrate the components of the global namespace as per present architecture 200.

Equation (3) illustrates that the global namespace comprises a plurality of management trees, such as management trees 210. In other words, global namespace includes the management trees 210. The management trees 210 may in turn further include either child management trees which in turn comprise further components or storage trees, as represented in equations 4 and 5, Equation (4) illustrates that each management tree 210 may include one or more child management trees 215 or one or more storage trees 220. It will be appreciated that the child management trees 215 may also be considered as a management tree 210 may be represented by the equation (4) above.

Further, as mentioned earlier, a storage tree 220 may map to one or more storage domains 225 and the same is represented is by equation (5), which indicates that each storage tree 220 may in turn include one or more storage domains 225. Accordingly, equations (4) and (5) correspond to the hierarchical structure represented in the storage network architecture 200 illustrated in FIG. 2.

Thus, it can be gathered that the present storage architecture 200 supports multiple tenants and at the same time provides for flexibility in storage capacity allocation to efficiently utilize the storage resources. The present subject matter may also provide fault resiliency. For instance, if a storage domain having data pertaining to a unit X of tenant A and unit Y of tenant B fails, then owing to segregation of data provided by way of storage trees, the data pertaining to unit X and Y may become unavailable; while, data pertaining to other units and tenants may not be impacted. Thus, the impact of a fault may be traceable and may not affect the entire storage system as such.

Figure 3:
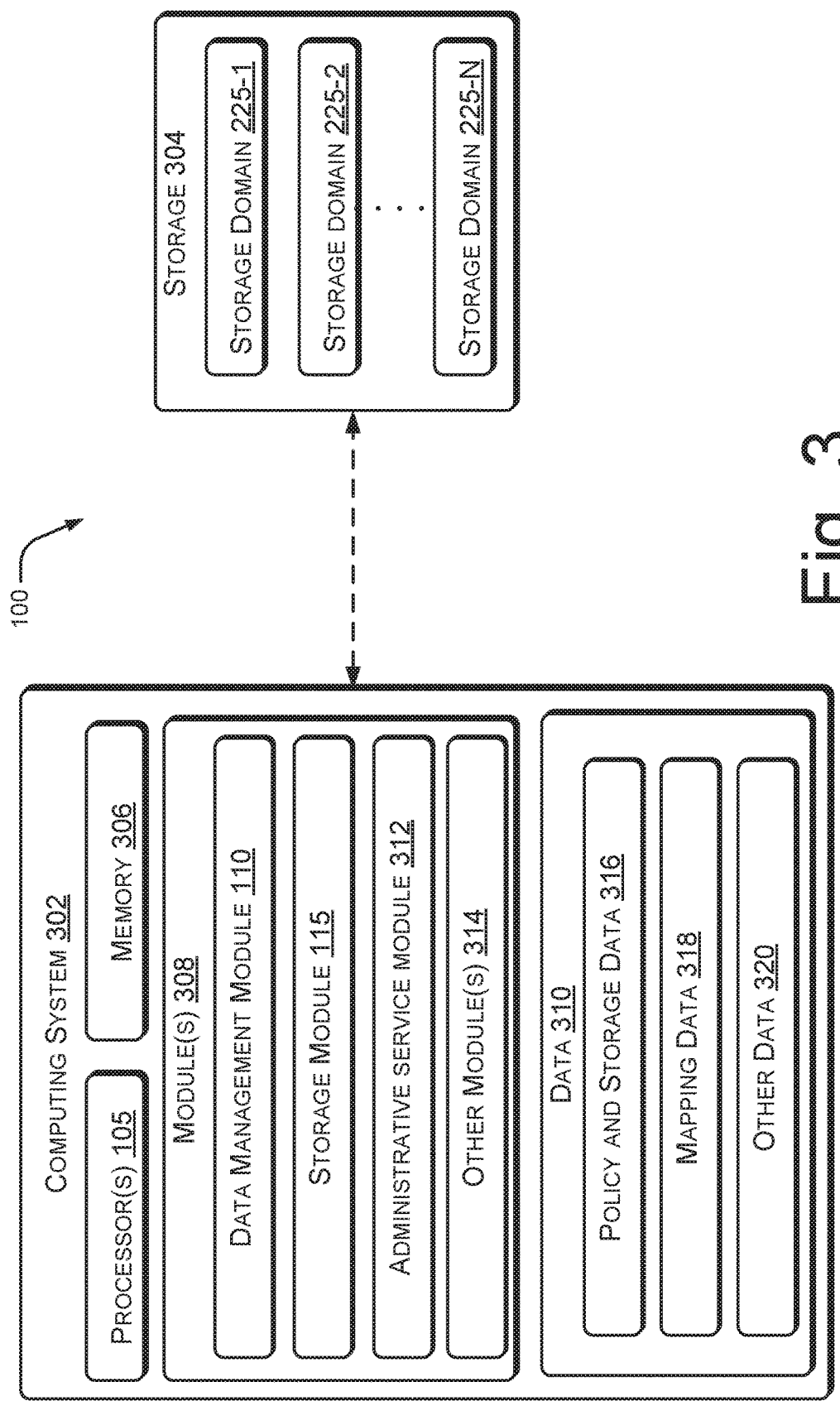
FIG. 3 illustrates a storage system implementing the storage network architecture, in accordance to an example of the present subject matter.

FIG. 3 illustrates the storage system 100 implementing the storage network architecture 200, according to an example of the present subject matter. The storage system 100 may provide storage space to multiple tenants. The storage system 100 may include a computing system 302 communicatively coupled to storage 304 offered by the storage system 100. The storage 304 may include the storage domains 225.

The computing system 302 may be implemented in, for example, desktop computers, multiprocessor systems, personal digital assistants (PDAs), laptops, network computers, cloud servers, minicomputers, mainframe computers, handheld devices, such as tablets. The computing system 302 may also be hosting a plurality of applications. The computing system 302 includes, for example, the processor(s) 105, interface(s) (not shown in figures), memory 306, modules 308, and data 310.

The interfaces may include a variety of commercially available interfaces, for example, interfaces for peripheral device(s), such as data input output devices, referred to as I/O devices, interface cards, storage devices, and network devices.

The memory 306 may be communicatively coupled to the processor(s) 105 and may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes.

The modules 308, amongst other things, include routines, programs, objects, components, and data structures, which perform particular tasks or implement particular abstract data types. The modules 308 may also be implemented as, signal processor(s), state machine(s), logic circuitries, and/or any other device or component that manipulate signals based on operational instructions. Further, the modules 308 can be implemented by hardware, by computer-readable instructions executed by a processing unit, or by a combination thereof.

The modules 308 may include the data management module 110, the storage module 115, an administrative service module 312, and other module(s) 314. The other modules 314 may include programs or coded instructions that supplement applications and functions, for example, programs in an operating system of the computing system 302. Further, the data 310 may include policy and storage data 316, mapping data 318, and other data 320. It will be appreciated that the management trees 210 may include the child management trees 215. Although, the data 310 has been illustrated internal to the computing system 302, it will be appreciated that the data may be provided on an external storage as well.

As mentioned earlier, the notion of the management trees 210 and the storage trees 220 enable the storage system 100 to provide storage capacity to multiple tenants in an efficient manner without comprising on data security. The management trees 210, the child management trees 215, and the storage trees 120 may be stored in the policy and storage data 316.

In one example, the data management module 110 may create a management tree for each of the tenants associated with the storage system 100. Further, the management tree 210 may be associated with a set of storage domains 225, which may provide storage capacity to the tenant corresponding to the management tree 210. As mentioned before, the storage domains 225 may be selected based on the storage attributes specified by the tenant.

Further, one or more storage trees 220 may be created for each of the management tree 210 and a sub-set of the storage domains 225 may be associated with each of the storage trees 220. In an example, the data management module 110 may identify the storage domains 225 to be associated with the storage tree 220. For instance, the sub-set of the storage domains 225 may be identified based on the storage attributes specified for a unit corresponding to the storage tree 220.

Once the hierarchical structure of the storage network architecture 200 is implemented in the storage system 100, data stored in the storage domains 225 forming the global storage space may be managed by the data management module 110 and the storage module 115. In an example, the data management module 110 and the storage module 115 may provide for managing data pertaining to various tenants, based on the corresponding management trees 115. The data management module 110 may identify the data management policies pertaining to a tenant and the storage module 115, based on the data management policies defined by identified the management tree, may manage the data stored in the storage 304. For instance, a data erasure policy of one tenant may state that the data pertaining to all it's unit are to be erased after two years, while the data erasure policy of another tenant may state that data pertaining to the infrastructure support unit is to be erased after one year, while the data pertaining to research and development is not be erased.

In another example, a data storage request from a user may also be processed, based on the data management policies defined by a corresponding tenant. Each data storage request may include a tenant ID indicating the tenant to which it belongs and for a unit ID indicating a unit of the tenant. To process the data storage request, the data management module 110 may determine the tenant ID of the data storage request. Based on the tenant ID, the data management module 110 may identify a corresponding management tree 210 using the mapping data 318. The mapping data 318 may include an ID to tenant mapping, a parent-child mapping, a management-storage tree mapping. The ID to tenant mapping may map each tenant ID to corresponding management tree 210. The parent-child mapping may map the management tree 210 to child management trees 215, if any. For the purpose of explanation, a management tree 210 having a child management tree 210 may be referred to as a parent management tree. The management-storage tree mapping may indicate the storage trees 220 corresponding to the management trees 210 and/or the child management trees 215.

Referring to the processing of the data storage requests, the data management module 110 may identify a corresponding tenant and thus, the management tree 210, based on the tenant ID obtained from the data storage request. Further, using the parent-child mapping, it may be ascertained whether unit-wise policies are to be implemented. In other words, the data management module 110 may ascertain whether the identified management tree 210 has the child management trees 215. In case the child management trees 215 exist for the tenant, the data management module 110 may identify a unit ID from the data storage request.

On determining the unit ID, corresponding child management tree 215 may be determined. It will be appreciated that a tenant may have separate data management policies for a single unit, while rest of the units may have same data management policies. In such a case, there may either be two child management trees 215 one defining the policies specific to a unit and other defining policies applicable to rest of the units; or there may be a single child management tree 215 as the management tree 210 may indicate that general data management policies are to be implemented for all units except for a specific unit for which the data management policies are defined in the child management tree 215. Accordingly, the data pertaining to various tenants stored in same or different storage domains 225 may be managed by the data management module 110, based on the corresponding management trees 210.

Based on the determined management tree, child or parent, the data storage request may be processed by the storage module 115. For instance, the storage module 115 may execute an authentication policy defined by the management tree to check the authenticity of the user to provide controlled access to the data. If the data storage request is authenticated, the storage module 115 may perform the indicated action, else it may be discarded and a notification may be provided to the user. In an example, the storage module 115 may be communicatively coupled to an authentication domain of the tenant to provide for processing of the data storage requests.

Further, on receiving the data storage request, the storage module 115 may identify the storage tree 220 mapping to the previously identified management tree. In an example, based on the identified storage tree 220, the storage module 115 may determine if additional data management policies are defined by the storage tree 220. In case additional data management policies are defined, the storage module 220 may determine whether the data management policies defined by the storage tree 220 override the policies defined by its parent management tree. The policy overriding rules may be stored in the policy and storage data 316. The policy overriding rules may indicate, for instance, the data management policies are to be checked from bottom of the hierarchy to the top. Further, in other examples, the policy overriding rules may also specify the exceptions to the bottom-up rule.

Based on the data management policy to be executed, the storage module 115 may process the data storage request and manage the data pertaining to a tenant. For example, the data storage request may be directed to data stored in the storage domains 225. Based on the storage tree 220, the storage module 115 may identify the corresponding storage domain 225 and perform, on execution of the data management policies, the input/output operation indicated by the data storage request on the storage domain 225. In other examples, the data storage request may be for accessing objects in a storage tree 120. Based on the authentication process discussed above, the data storage request may accordingly be routed to the corresponding storage tree.

Further, the computing system 302 may also include the administrative service module 312, which may provide for capacity expansion, addition, deletion, and modification of management trees and storage trees. For instance, when a tenant exhausts the allocated storage capacity and request for additional storage capacity, certain storage capacity from one or more other storage domains 225 may be allocated to the tenant. The storage domains 225 may be selected based on the storage attributes specified by the tenant. It will be appreciated that these storage attributes may be specified in the management tree 210 corresponding to the tenant. In another example, in anticipation of future capacity growth, an additional storage domain 225 may be proactively added to the storage system 110. In said example, the administrative service module 312 may associate the newly added storage domain 225 to one or more management trees 210. Accordingly, the storage trees 220 corresponding to these management trees 210 may expanded to include the additional storage domain 225.

Based on the storage domains 225 to be added, the administrative service module 312 may modify the storage tree 220 associated with the tenant to reflect the capacity expansion and to map the new storage domains 225. Further, in other examples, where new storage domains 225 are to be added to the storage system 100, the new storage domain 225 may be mapped to the global namespace, such as the global namespace 205 through the storage tree 220. For instance, the administrative service module 312 may add the new storage domain 225 to global storage space used by the global namespace 205. As mentioned earlier, the storage tree 220 is also mapped to it's parent management tree 210 or 215, accordingly, the data in the new storage domain 225 may also be managed based on the data management policies defined by the parent management tree 210 or 215.

Figure 4:
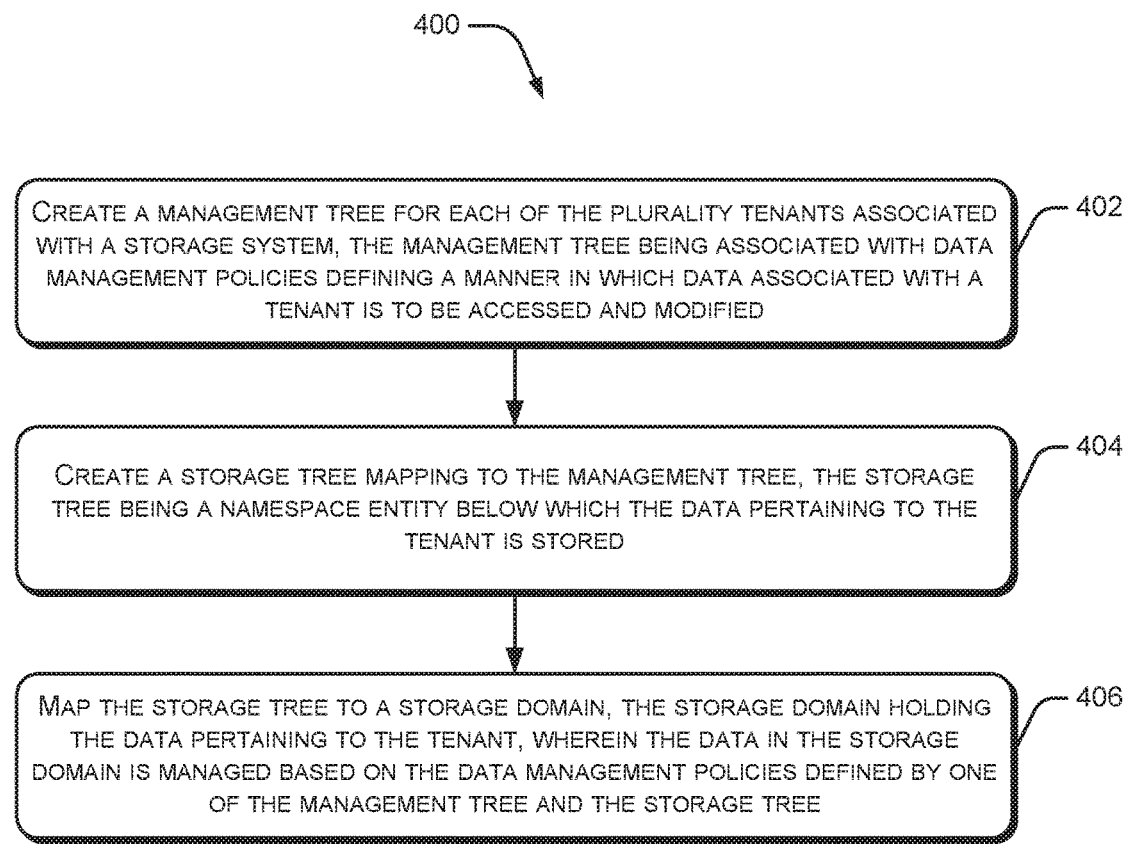
FIG. 4 illustrates a method for providing storage capacity to a plurality of tenants supported by a storage system, in accordance to an example of the present subject matter.
Figure 5:
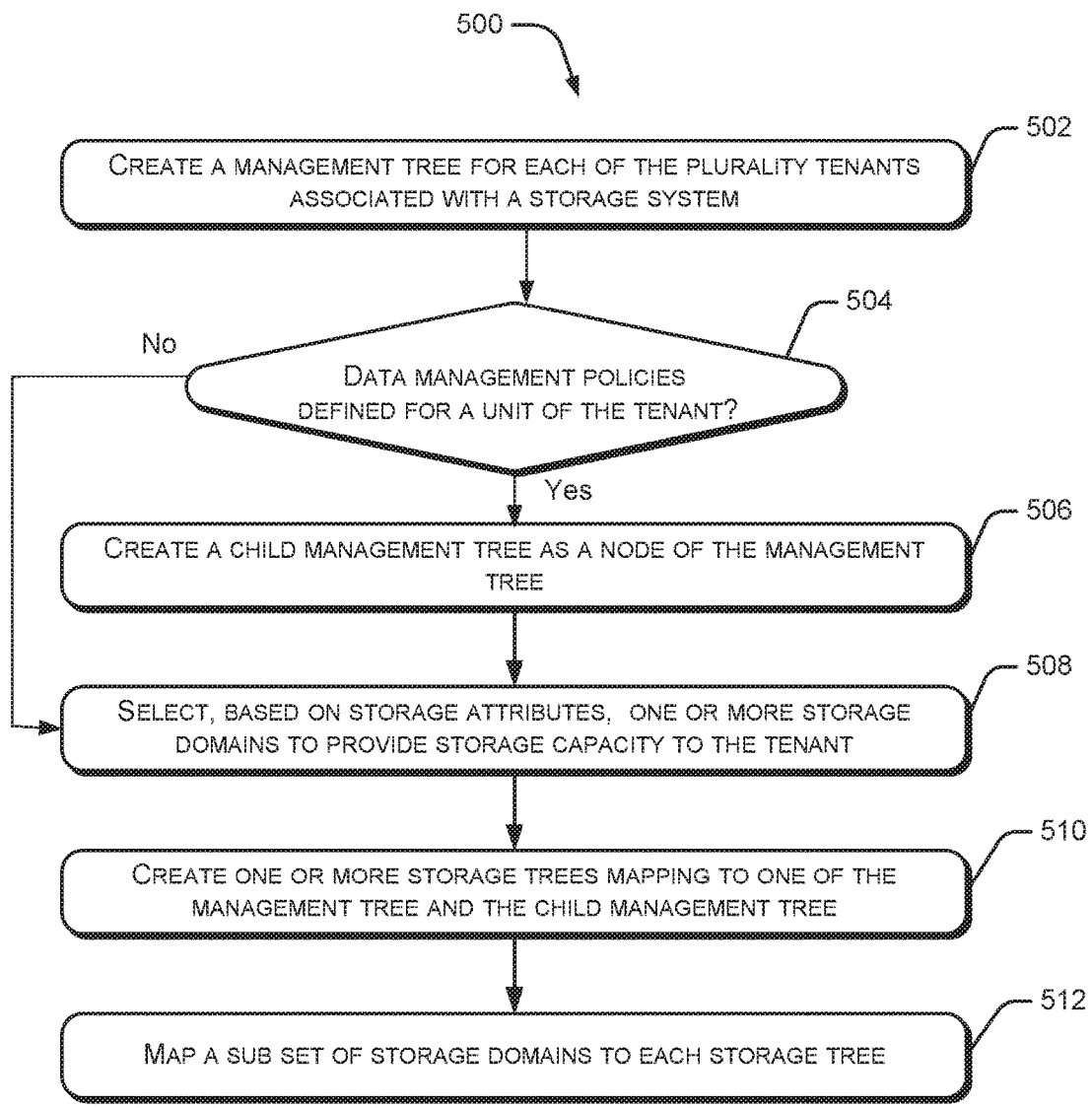
FIG. 5 illustrates a method for providing storage capacity to a plurality of tenants supported by a storage system, in accordance to another example of the present subject matter.

FIG. 4 and FIG. 5 illustrate method 400 and method 500 for providing storage capacity to a plurality of tenants associated with a storage system, such as the storage system 100, according to various examples of the present subject matter.

The order in which the methods are described is not intended to be construed as a limitation, and some of the described method blocks can be combined in a different order to implement the methods, or an equivalent alternative method. Additionally, individual blocks may be deleted from the methods without departing from the spirit and scope of the subject matter described herein. Furthermore, the methods may be implemented in any suitable hardware, computer-readable instructions, or combination thereof.

It is appreciated that the methods can be performed by programmed computing devices, for example, based on instructions retrieved from non-transitory computer readable media. The computer readable media can include machine-executable or computer-executable instructions to perform a whole or a part of the described method. The computer readable media may be, for example, digital memories, magnetic storage media, such as a magnetic disks and magnetic tapes, hard drives, or optically readable data storage media.

As depicted in FIG. 4, at block 402, a management tree for each of the plurality tenants associated with a storage system may be created. The management tree may be associated with data management policies, which may define the manner in which data associated with a tenant is to be accessed and modified.

At block 404, at least one storage tree mapping to the management tree may be created. The storage tree may be a namespace entity below which the data pertaining to the tenant is stored.

At block 406, the storage tree may be mapped to one or more storage domains. The storage domains may hold the data pertaining to the tenant, wherein the data in the storage domain is managed based on the data management policies defined by one of the management tree and the storage tree.

Referring to FIG. 5, at block 502, a management tree is created for each tenant associated with a storage system. Further, each management tree may be associated with data management polices defining the rules to manage data pertaining to the corresponding tenant.

At block 504, it is ascertained whether the data management policies specific for a unit of tenant are defined. In case it is ascertained that the data management policies specific for a tenant are defined, the method 500 may branch to ('Yes' block) block 506.

At block 506, a child management tree is created as a node of the management tree. Each node of the management tree may represent a unit of the tenant and may have unit specific data management policies.

However, if at block 504, it is ascertained that the data management policies specific for the unit of tenant are not defined, the method 500 may proceed to ('No' branch) block 508.

At block 508, one or more storage domains are selected, based on storage attributes specified by the tenant, to provide storage capacity to the tenant. The storage domains may be associated with storage attributes, such as fault containment, performance, pricing, and geographic location.

At block 510, one or more storage trees mapping to one of the management tree and the child management tree are created. The storage trees may directly map to the management tree, in case the management tree does not have any child nodes. A storage tree may an entity in the global namespace below which data and objects pertaining to the tenant are stored.

At block 512, each storage tree is mapped to a sub-set of the storage domains.

In an example, while generating the storage network architecture or subsequent to creation of storage network architecture, such as the storage network architecture 220, it may be ascertained whether storage capacity allocated to the tenant or the storage capacity of the storage system, i.e., global storage space, is to be expanded. In case it is ascertained the storage capacity of the storage system is to be expanded, an additional storage domain may be added and mapped to storage trees corresponding to one or more tenants. In other words, the storage trees may be mapped to the management trees corresponding to the tenants. In another example, if the storage capacity of a tenant is to be expanded, the additional storage domain may be selected for the tenant, based on the storage attributes specified by the tenant as indicated at block 508. Further, the additional storage domain may be mapped to the storage tree to reflect the capacity expansion. In an example, the administrative service module 312 provides for capacity expansion.

Figure 6:
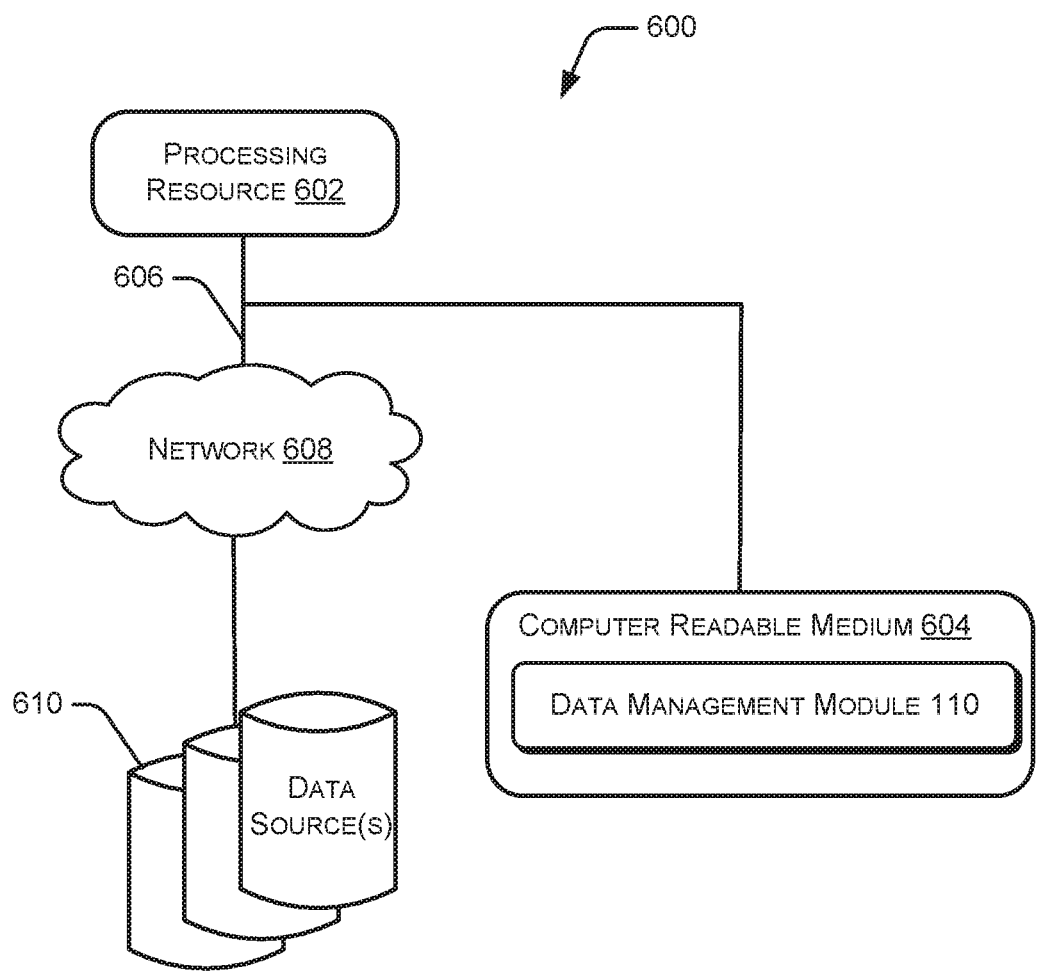
FIG. 6 illustrates a computer readable medium storing instructions for managing data pertaining to a plurality of tenants supported by a storage system, in accordance to an example of the present subject matter.

FIG. 6 illustrates an example network environment 600 implementing a non-transitory computer readable medium for managing data in a multi-tenant capable storage system, according to an example of the present subject matter. The network environment 600 may be a public networking environment or a private networking environment. In one implementation, the network environment 600 includes a processing resource 602 communicatively coupled to a non-transitory computer readable medium 604 through a communication link 606.

For example, the processing resource 602 can be a processor of a network device, such as the computing system 302. The non-transitory computer readable medium 604 can be, for example, an internal memory device or an external memory device. In one implementation, the communication link 606 may be a direct communication link, such as one formed through a memory read/write interface. In another implementation, the communication link 606 may be an indirect communication link, such as one formed through a network interface. In such a case, the processing resource 602 can access the non-transitory computer readable medium 604 through a network 608. The network 608 may be a single network or a combination of multiple networks and may use a variety of different communication protocols.

The processing resource 602 and the non-transitory computer readable medium 604 may also be communicatively coupled to data sources 610 over the network 608. The data sources 610 can include, for example, databases and computing devices. The data sources 610 may be used by the database administrators and other users to communicate with the processing resource 602.

In one implementation, the non-transitory computer readable medium 604 includes a set of computer readable instructions, such as instructions for implementing the data management module 110. The set of computer readable instructions, referred to as instructions hereinafter, can be accessed by the processing resource 602 through the communication link 606 and subsequently executed to perform acts for managing data pertaining to multiple tenants supported by the storage system 100.

For discussion purposes, the execution of the instructions by the processing resource 602 has been described with reference to various components introduced earlier with reference to description of FIGS. 1-3. In an example, on execution by the processing resource 602, the data management module 110 create a management tree 210 corresponding to a tenant Further, a set of storage domains 225 may be associated with the management tree 210 to provide storage capacity. The management tree 210 may comprise one or more storage trees 220 to provide for capacity management. A subset of the storage domains 225 from the storage domains 225 associated with the management tree 210 may be mapped to the storage tree 210. The data in the storage domain 225 mapped to the storage tree 220 may be managed based on the data management policies defined by one of the management tree and the storage tree.

Thus, the methods and systems of the present subject matter provide for supporting multiple tenants with the flexibility of capacity allocation and at the same time ensuring data security. Although examples for the present disclosure have been described in language specific to structural features and/or methods, it should stood that the appended claims are not necessarily limited to the specific features or methods described. Rather, the specific features and methods are disclosed and explained as examples of the present disclosure.

What is claimed is:

1. A storage system comprising:
a processor; and
a non-transitory storage medium storing data management instructions and storage instructions, the data management instructions executable on the processor to:
responsive to an access request from a first tenant of a plurality of tenants, access a namespace hierarchical structure comprising a plurality of management trees associated with respective tenants of the plurality of tenants, and
identify a first management tree, corresponding to the first tenant, from among the plurality of management tree, the first management tree being a namespace entity in the namespace hierarchical structure and having data management policies corresponding to the first tenant, wherein the namespace hierarchical structure further comprises storage trees mapped to respective management trees of the plurality of management trees; and
the storage instructions executable on the processor to:
identify a first storage tree corresponding to the first management tree, the first storage tree being one of the storage trees, wherein the first storage tree is a namespace entity in the namespace hierarchical instructions, the first storage tree providing for storage capacity management based on storage domains mapped to the first storage tree, the storage domains to store data of the first tenant, and
for the access request, execute a data management policy to manage data in a storage domain of the storage domains mapped to the first storage tree, wherein the data management policy is defined by one of the first management tree and the first storage tree.

2. The storage system of claim 1, wherein the storage instructions are executable on the processor to:
ascertain whether the first storage tree includes an additional data management policy;
in response to the first storage tree including the additional data management policy, determine whether the additional data management policy overrides a data management policy defined by the first management tree, based on a policy overriding rule; and
execute the additional data management policy to process the access request, based on the determining.

3. The storage system of claim 1, wherein the storage system comprises a global namespace based scale out storage system.

4. The storage system of claim 3, wherein each of the first management tree and the first storage tree is provided as a directory in a global namespace.

5. The storage system of claim 1, wherein the access request comprises an identifier of the first tenant, and wherein identifying the first management tree from among the plurality of management trees is based on the identifier of the first tenant.

6. The storage system of claim 1, wherein the storage domains are mapped to the first storage tree based on storage attributes defined by the first management tree.

7. The storage system of claim 1, wherein the namespace hierarchical structure further comprises child management trees that are linked to the first management tree, the child management trees associated with different units of the first tenant, and wherein the data management instructions are executable on the processor to:
select a child management tree of the child management trees based on a unit identifier that identifies a unit of the first tenant, the selected child management tree comprising a further data management policy for the identified unit of the first tenant to be applied in processing the access request.

8. The storage system of claim 1, further comprising administrative instructions executable on the processor to:
in response to detecting that the first tenant has exhausted a storage capacity of the first storage tree, allocate additional storage capacity to the first tenant by selecting an additional storage domain, and mapping the additional storage domain to the first storage tree in the namespace hierarchical structure.

9. The storage system of claim 8, wherein the administrative instructions are executable on the processor to:
select the additional storage domain based on storage attributes specified by the first data management tree.

10. A method performed by a system comprising a hardware processor, comprising:
creating a respective management tree for each of a plurality of tenants, the management trees being part of a namespace hierarchical structure associated with a storage system, each management tree of the management trees being associated with data management policies defining a manner in which data associated with a respective tenant is to be accessed and modified;
creating storage trees linked to the management trees in the namespace hierarchical structure, each storage tree of the storage trees being a namespace entity of the namespace hierarchical structure and below which data pertaining to the respective tenant is stored; and
mapping, in the namespace hierarchical structure, a first storage tree of the storage trees to storage domains of the storage system, the storage domains holding data pertaining to a first tenant, wherein the first storage tree provides for storage capacity management based on the storage domains mapped to the first storage tree;
in response to an access request from the first tenant, identifying a first management tree of the first management trees;
identifying the first storage tree that is linked to the first management tree; and
executing a data management policy as part of processing the access request, the data management policy that is executed specified by the first management tree or the first storage tree.

11. The method of claim 10, comprising:
determining whether a unit-wise data management policy specific to a unit of the first tenant is defined by the first tenant; and
creating a child management tree as a node of the first management tree, in response to determining that the unit-wise data management policy specific to the unit is defined, wherein the first storage tree maps to the child management tree in the namespace hierarchical structure.

12. The method of claim 10, wherein the mapping comprises selecting, based on storage attributes specified by the first tenant, the storage domains to be mapped to the first storage tree.

13. The method of claim 10, wherein further comprising:
ascertaining whether an additional storage capacity is to be allocated to the first tenant;
selecting, based on storage attributes specified by the first tenant, a new storage domain to provide the additional storage capacity; and
mapping the new storage domain to the first storage tree for capacity expansion.

14. A non-transitory computer readable medium comprising instructions that, when executed, cause a system to:
provide a namespace hierarchical structure comprising a plurality of management trees associated with respective tenants of a plurality of tenants, each management tree of the plurality of management trees comprising data management policies for a storage system, and wherein the namespace hierarchical structure further comprises storage trees mapped to respective management trees of the plurality of management trees, the storage trees to provide storage capacity management for respective tenants of the plurality of tenants;
in response to an access request from a first tenant, identify a first management tree, corresponding to the first tenant, from among the plurality of management trees;
as part of processing the access request, identify a first storage tree of the storage trees, the first storage tree corresponding to the first management tree, and wherein the first storage tree provides for storage capacity management based on storage domains mapped to the first storage tree, the storage domains to store data of the first tenant; and
execute a data management policy to manage data in a storage domain of the storage domains mapped to the first storage tree, the data management policy defined by the first data management tree or the first storage tree.

15. The non-transitory computer readable of claim 14, wherein the instructions, when executed, further cause the system to identify, based on a parent-child mapping, a child management tree of the first management tree, the child management tree defining a unit-wise data management policy corresponding to a unit of the first tenant.

16. The non-transitory computer readable of claim 14, wherein the instructions, when executed, further cause the system to:
ascertain whether the first storage tree includes an additional data management policy;
in response to the first storage tree including the additional data management policy, determine whether the additional data management policy overrides a data management policy defined by the first management tree, based on a policy overriding rule; and
execute the additional data management policy, based on the determining.

17. The non-transitory computer readable medium of claim 14, wherein the access request comprises an identifier of the first tenant, and wherein identifying the first management tree from among the plurality of management trees is based on the identifier of the first tenant.

18. The non-transitory computer readable medium of claim 14, wherein the storage domains are mapped to the first storage tree based on storage attributes defined by the first management tree.

19. The non-transitory computer readable medium of claim 14, wherein the instructions, when executed, further cause the system to:
in response to detecting that the first tenant has exhausted a storage capacity of the first storage tree, allocate additional storage capacity to the first tenant by selecting an additional storage domain, and mapping the additional storage domain to the first storage tree in the namespace hierarchical structure.

20. The non-transitory computer readable medium of claim 19, wherein the instructions, when executed, further cause the system to:
select the additional storage domain based on storage attributes specified by the first data management tree.

* * * * *